United States Patent Office 2,913,935
Patented Nov. 24, 1959

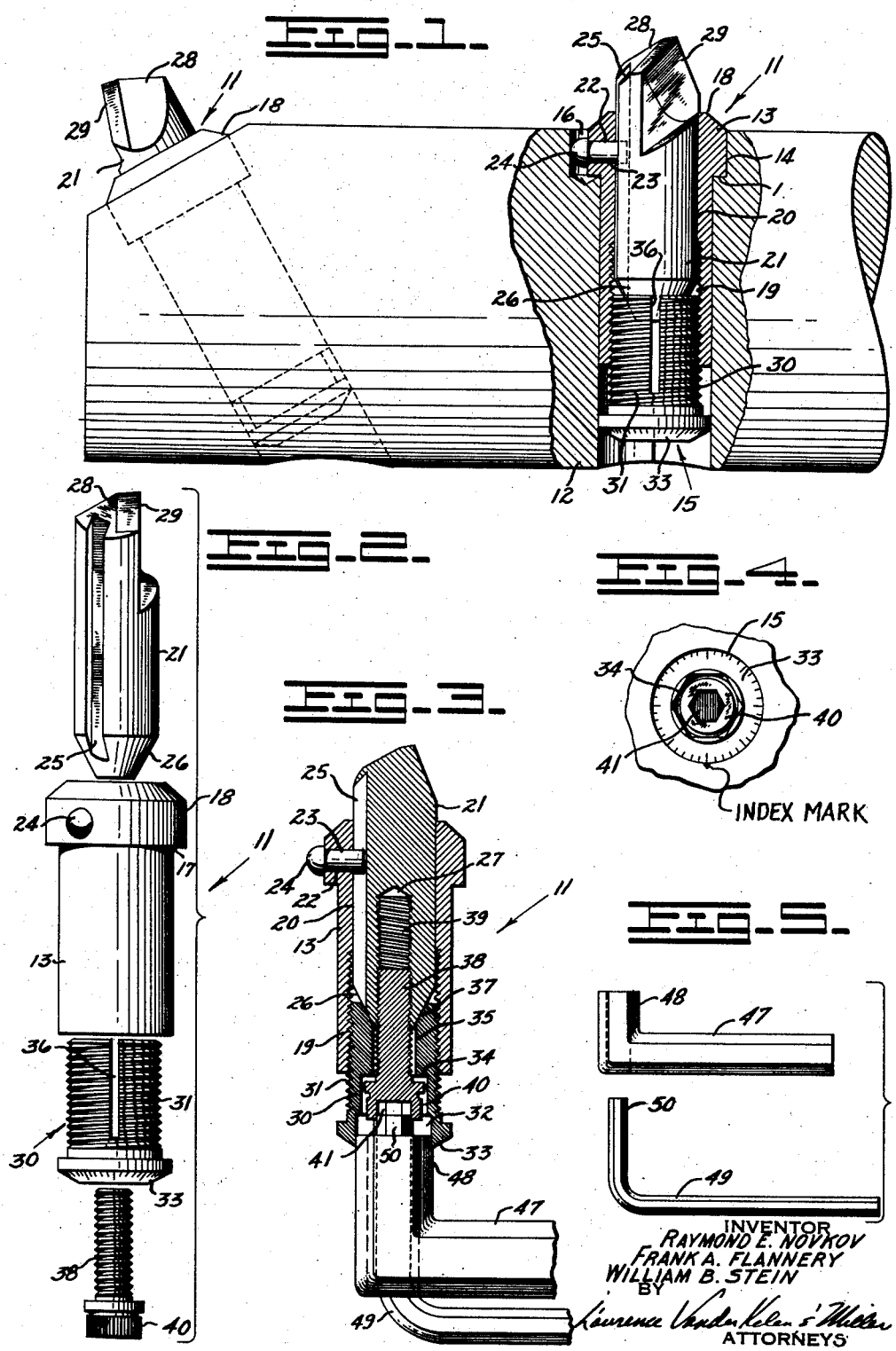

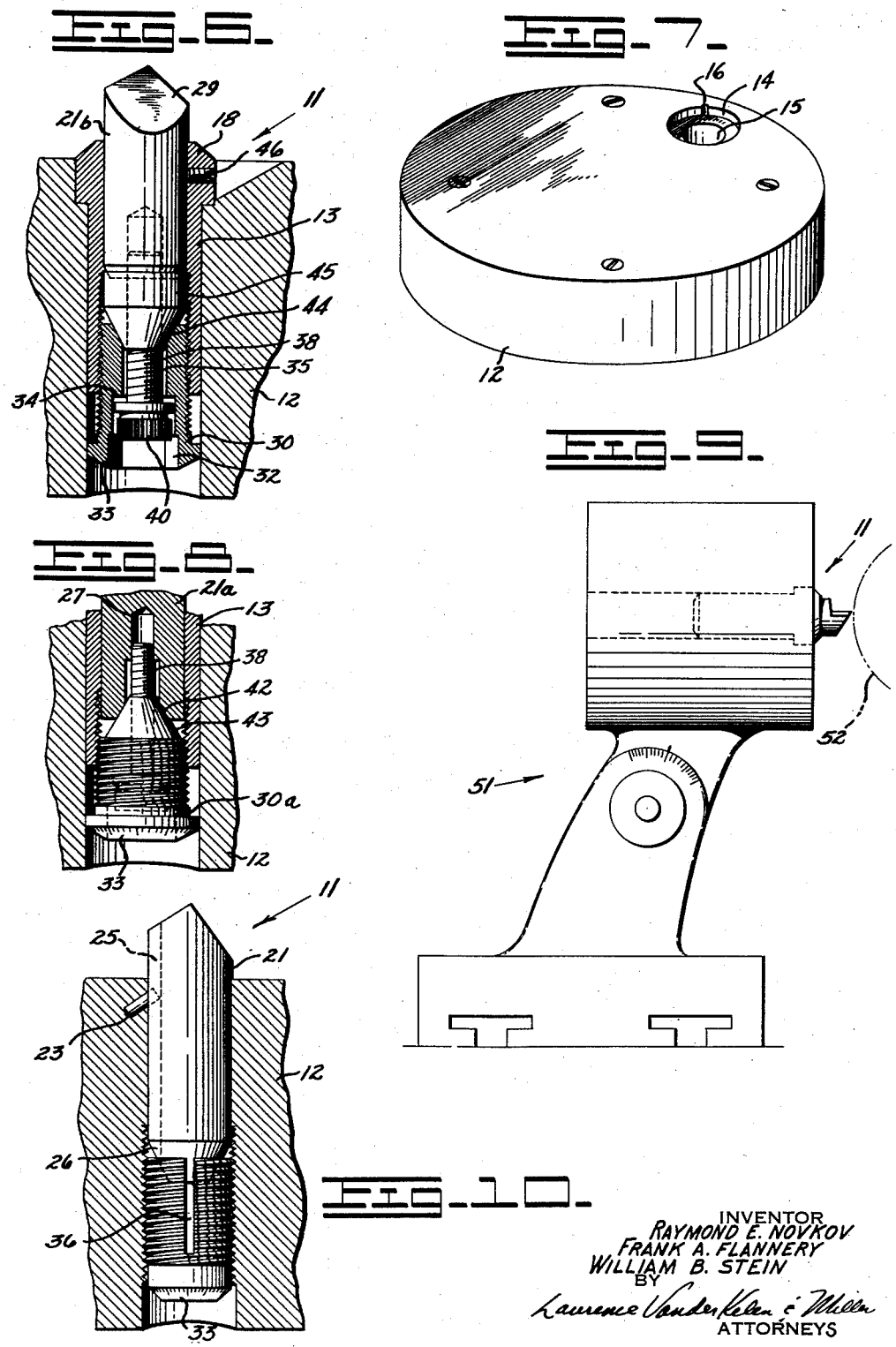

2,913,935
TOOL HOLDER

Frank A. Flannery and Raymond E. Novkov, Akron, and William B. Stein, Barberton, Ohio; said Stein assignor to said Flannery and Leonard W. Kuttler, Jr., Cuyahoga Falls, Ohio, and said Novkov assignor to Leonard W. Kuttler, Jr.

Application June 27, 1955, Serial No. 518,311

5 Claims. (Cl. 77—58)

The present invention relates to a tool holder and more particularly to an improved micrometer adjusting tool holder and including a positive locking feature within the unit.

In the prior art, for example, that illustrated in United States Letters Patent 2,537,517, a tool holder particularly adaptable to boring bars and the like has been provided. However, such tool holders are expensive and the principal difficulty has been in making an adjusting holder which can be inserted by a tool used in a number of installations with a minimum amount of difficulty without sacrificing accuracy. The fundamental problem lay in providing a tool holder assembly which would secure itself against rotating stresses or forces while in use without involving the broaching, for example, of internal flats, slots, or keyways in the base member, for example a boring bar against which the mating tool holder seats. If such an arrangement could be avoided then users of such tool holders could adapt the holding units to varied uses with a minimum expenditure of time while retaining the accuracy of adjustment possible in micrometer type adjusting tool holders. Further, the prior art has not taught a simple holder unit wherein the essential parts are adaptable to high production and consequent low cost without sacrifice of accuracy. None of the known prior art has taught a locking feature in a tool holder which radially expands an element within the unit to seize against a matingly threaded case.

Therefore, among the principal objects of the present invention is the presentation of a tool holder unit which is easily installed where used on any convenient base member.

Another object is to provide a tool holder which locks itself against rotational thrust without requiring slots in the base member.

Another object is to provide a tool holder which permits accurate repetitive positioning of the tool in accord with the micrometer adjustment despite the locking and unlocking of the tool holder.

Another object is to provide a tool holder and wrench combination for adjustment and locking wherein the advance of the tool may be rigidly held while locking is being accomplished.

Another object is to provide a much simpler and positive arrangement of locking adjustable tool holding components against axial movement and having fully enclosed adjusting surfaces.

Still another object is to provide a tool holder with an expansion type lock accomplished internally by a unique arrangement of concentric mating elements.

A further object is to provide a tool holder adapted for interchangeability with integrated accuracy useful in a variety of installations.

Other objects will be increasingly obvious to those skilled in the art as the description proceeds, including economy in production, simplicity in use, and rigid substantially chatterless tool control.

In the drawings:

Figure 1 is a side elevation view of a base member, for example, a boring bar, showing two positions possible with an assembly in accord with the present invention and showing one of the installations cut away to reveal the installational detail.

Figure 2 is an elevational exploded view of a tool holder in accord with the present invention.

Figure 3 is a full cross section view of an assembled tool holder in accord with the present invention and illustrates the simultaneous engagement of adjusting and locking wrenches.

Figure 4 is a partial rear elevational view of a base member showing the micrometer style calibrated face of the tool holder.

Figure 5 is an exploded view of the cooperating adjusting and locking wrenches.

Figure 6 is a section view showing a modification of the tool holder in accord with the present invention illustrating the interposition of a buffer between the tool and adjusting element and illustrating the use of a set screw for countering rotational and vibrational stresses.

Figure 7 is a perspective view of a face plate or end mill plate showing the mounting for insertion of tool holder assemblies in accord with the present invention.

Figure 8 is a partial sectional elevation of another modification of the present invention showing a male ended adjusting screw element acting against a female ended mating tool element in locking and adjusting relationship.

Figure 9 is an elevation view of a universally adjustable jig or dressing fixture provided with a suitable bushing for sharpening or reworking a tool face mounted on tool holders of the present invention.

Figure 10 is an elevational cross section view of another modification of a tool holder in accord with the present invention showing the elimination of a bushing element and having the tool holder assembly directly inserted in a threaded opening in the base member.

Specific description

Referring more particularly to the drawings, in Figure 1 a tool holder unit 11 is shown in its assembled form installed in a base member 12. It will be readily appreciated that the axis of the holder unit 11 may be tilted as required, limited only by the requirements of the use to which the tool tip is to be put. The base member 12 is drilled or bored to receive a bushing 13. A counterbore 14 is provided concentric with the bored or drilled opening 15 in the base member 12. A groove or channel 16 is provided, as desired, by any given tooling arrangement in the face of the counterbore 14. The groove parallels the axis of the opening 15. The purpose of the groove 16, for example, its use as an index for circumferential orientation of a given tool, will be more readily appreciated as the description proceeds.

A bushing 13 is provided having an external diameter substantially equal to the internal diameter of the opening 15. The fit is preferably a press or force fit securing the bushing 13 peripherally in the opening 15 in the base member 12. A shoulder 17 of increased diameter is provided at one end of the bushing 13 and is formed by the head 18 of the bushing 13. The head 18 fits into the counterbore 14 of the base member 12 and the shoulder 17 seats against the base member 12 as best indicated in the assembled unit in Figure 1. The bushing 13 is provided internally with a selected thread 19. The threaded portion 19 extends partially the length of the bushing 13 and its selection will be further clarified as the description proceeds. The unthreaded remainder 20 of the bushing 13 extends to the head 18 of the bushing 13 and is of such a diameter to provide a snug sliding fit with a tool body 21. One wall of the head 18 of bushing 13 is penetrated by an opening 22 through which a pin 23 is inserted. The pin 23 is force-fitted into the opening 22 extending into the bore of the bushing 13 and projects externally from the bushing 13 in the preferred hemispherical pin head 24. The opening 22 through which the pin 23 is inserted is radially disposed with respect to the axis of the bushing 13. The pin head 24 projects outwardly from the bushing 13 to engage itself in the channel or recess 16 in a base member 12.

A tool body 21 is provided of generally cylindrical configuration and is provided with a longitudinal slot 25 running substantially the length of the body 21. At one end of the body 21 a taper is provided forming a frusto conical surface 26. The axis of the frusto conical surface 26 and the axis of the tool body 21 are coincidental. A blind hole 27 is axially provided in the tapered end of the tool body 21. The hole 27 is threaded and the thread series here is not important with regard to the calibrated micrometer movement. The purpose of this threaded hole 27 will become apparent as the description proceeds. At the end of the tool body 21, opposite the frusto conical surface 26 a step or ledge 28 provides a surface upon which a working face 29, for example a carbide tip is attached.

A generally tubular adjusting sleeve 30, being externally threaded throughout substantially its entire length is provided. Externally provided sleeve threads 31 mate with the internal threads 19 of the bushing 13. The selection of threads determine the amount of feed, per revolution, and calibrations are made in a well known manner, for example where 25 equal graduations appear on the adjusting sleeve and the pitch or lead of the thread is .025 inch, then the amount of feed for each division on the sleeve is .001 inch, or .002 inch on work diameter. A recessed socket 32 and a calibrated head 33 are provided on one end of the adjusting sleeve 30. The recess 32 may be of any convenient configuration, but an hexagonal configuration has been found most satisfactory since universally available hexagonal shaped members for turning can be inserted therein for turning the adjusting sleeve 30. The recess 32 forms an annular shoulder 34 about the opening 35. The other end of the adjusting sleeve 30 is split by a plurality of longitudinal openings 36. A single opening 36 will serve but the plural form is preferred. The expansion of the sleeve 30 is sought and by a selection of expanding sleeve material it will be appreciated that slots may be avoided. The expanding end of the adjusting sleeve 30 is provided with an internal frusto conical surface 37 which mates with the frusto conical surface 26 provided on the end of the tool body 21.

A lock screw 38 fits easily through the opening 35 in the recessed head 32 and through the adjusting sleeve 30 and is threadably engageable with the threads 39 in the opening 27 in the tool body 21. An enlarged head 40 on the lock screw 38 abuts the annular shoulder 34 in the recessed socket 32 of the adjusting sleeve or screw 30.

When the lock screw 38 is drawn up, the tool body 21 is drawn snugly against the adjusting sleeve 30 and the mating frusto conical surfaces 37 and 26 on sleeve 30 and body 21 respectively force the expanding portion of the sleeve 30 outwardly. When the adjusting sleeve 30 is contained in the bushing 13 this force causes the threads 31 to seize and lock as the split portion of the sleeve 30 is expanded. The lock screw 38 is also provided with a recess 41 in the head 40 of a configuration so that it may be turned by convenient tools having a similar cross sectional configuration. An hexagonal recess 41 has proved most satisfactory. When the lock screw 38 is loosened slightly then the adjusting sleeve 30 may be rotated as desired to back off or advance the tool body 21 toward or away from stock being machined. The calibrated end 33 of the adjusting sleeve is visible and when referenced to any simple mark on the base member 12 (as shown in Figure 4) causes a known amount of axial movement to be observed in the tool body 21. Subsequent locking of the tool holder 11 does not disturb the calibrated adjustment set by the sleeve 30.

It will be understood that a variety of tips 29 may be attached to the tool body 21 and that the tool body 21 itself may be made of tool steel hardened sufficiently to serve as a working face. Similarly, a variety of materials may comprise the material from which the various components are made. Plastic, and in particular nylon bushings have been found useful. As to positioning, it will be noted that the channel 16 in the counterbore 14 may be variably located so as to change the circumferential positioning of the tool body 21. In installation, the channel 16 serves as a tool orienting reference. Various styles of tool bodies 21 for mounting various tips are also intended to be included in the present description.

It will be further appreciated that the tool body 21a can be split and provided with a female frusto conical surface 42 as shown in Figure 8 and that the adjusting sleeve 30a may be then provided with a mating male frusto conical surface 43 so as to cause expansion of the tool body 21a against a bushing 13. In some installations it will be understood that the bushing 13 may be eliminated where the opening 15 through the base member 12 is threaded as in Figure 10. Both of these modifications are illustrated and their limitations and advantages will be readily apparent to those skilled in the art.

Another modification is illustrated best in Figure 6 where the expanding sleeve member 30 extends into the bushing 13 and by reason of the mating surfaces 37 and 44, respectively, in the sleeve 30 and buffer 45, is expanded onto internal threads 19 in the bushing 13 when the lock screw 38 extending into and through the buffer 45, is tightened. The buffer 45 is provided with a bore axially therethrough, said bore having a diameter sufficient to allow the lock screw 38 to pass freely through the buffer 45. In such an instance the buffer 45 is generally cylindrical and serves as a back-up base against which a separate tool body 21b is butted. In such modification a set screw 46 is desirable to clamp the tool body 21b and/or lock the tool body 21b against rotation in the bushings 13.

In Figures 3 and 5 a pair of adjusting and locking tools are illustrated. The larger tool 47 is provided having at least at one end a shank 48 of mating configuration which fits snugly into the recessed head 33 of the adjusting sleeve 30. The shank 48 is hollow and of such a diameter as to permit the turnable insertion of a lock screw tool 49. The lock screw tool 49 is of similar mating configuration at least at its tip 50 so as to snugly fit into the recessed head 40 of the lock screw 38. With this arrangement of wrenches, illustrated in Figure 5, the locking and adjusting of the tool holder unit 11 is easily accomplished. Similar tools well known in the trade can be used individually. However, with the wrench arrangement herein described a setting is accurately held while locking the structure.

Operation

A hole 15 of suitable size and at any selected angle is drilled or bored in a base member 12. The base member 12 may be a boring bar, face mill, or the like (Figures 1 and 7) in common use in tool and machine shops. A counterbore 14 is provided concentric with the through hole 15, and the counterbore 14 is provided with a shallow channel 16. The bushing 13 of the tool holder unit is pressed into the machined opening and the tool body 21 inserted in the bushing 13 so that the longitudinal slot 25 mates with the internal extension of the pin 23 provided in the bushing 13. The pin head 24 seats in the channel 16 in the counterbore 14, and prevents the rotation of the bushing 13 and the tool body 21 while allowing the tool body 21 to move axially. The split adjusting sleeve 30 is threaded into the bushing 13. The lock screw 38 is passed through the adjusting sleeve 30 and threaded into the tool body 21 drawing the mating frusto conical faces 26 and 37 on the tool body 21 and sleeve 30 into snug relationship. Final adjustments are made by rotation of the adjusting sleeve 30 and observed accurately by reason of the calibrated micrometer type face 33 referenced to a selected mark on the base member 12. Thus the calibrated face 33 is coordinated with the thread movement occurring internally within the tool holder unit 11. Such a method of calibration is well known and no further description is thought necessary. When proper adjustment of the tool body 21 is accomplished, the lock screw 38 is tightened and by reason of the mating frusto conical surfaces 26 and 37 the split adjusting sleeve 30 is expanded to lock sleeve 30 and bushing 13 into positive relationship. The mating tapered or conical surfaces 26 and 37 are preferably 60 degrees constituting the included angle at the cone axis. Other angles have been tried and the most desirable results were obtained between 40 degrees and 90 degrees.

In exploded form (Figure 2) the assembly interrelationship of the members comprising the tool holding unit is best illustrated. The sectional view presented in Figure 3 illustrates best an assembled structure and operationally shows the coordinated adjustment possible using the combination of wrenches 47 and 49 shown.

In sharpening, the tool tip 29 may be sharpened while in the base member 12 or sharpening may be accomplished by removing the tool body 21 and inserting it in a sharpening jig 51 such as shown in Figure 9 provided with a bushing 13, adjusting sleeve 30 and lock screw 38 as shown in Figures 1, 2 and 3. The tool advance feature assists in the sharpening operation where such installations are used. Calibrated advance to a grinding surface 52, as shown in Figure 9, is found advantageous.

It will thus be appreciated that a new and useful tool holder structure has been provided which is adaptable to a wide range of machine tool applications. The positive locking, the simplicity of parts relationships, and the ease of installation will be readily apparent.

Having thus described the invention it will be appreciated that some modifications may be made within the skill of the art and that such modifications are intended to be included in the invention limited only by the scope of the hereinafter appended claims.

We claim:

1. A tool holder combination for insertion in a base member including: a bushing having internal threads; a key member extending into the bore of said bushing; a tool body insertable in said bushing and provided with a longitudinal slot into which the internal extension of said key member slides, and said body having a frusto conical surface at one end and being internally threaded at the frusto conical end; a split threaded adjusting sleeve threadably engaging the threads in said bushing and having a frusto conical end mating with the frusto conical end of said tool body; and a lock screw extending through said adjusting sleeve and threadably engaging said tool body for drawing said tool body toward the mating frusto conical surface on said adjusting sleeve thereby expanding said sleeve and locking the entire assembly into immovable relationship.

2. In a tool adjustment mechanism for boring bars and the like, the combination including: a base member having an opening therethrough and having a coaxial counterbore forming a face and with a radially provided recess at one of the ends of said opening forming a face transverse to the axis of said opening; a shouldered bushing member of tubular character for insertion in said base member and having a radial opening through the wall thereof and said bushing being threaded internally at one end; a split tubular adjusting sleeve externally threaded and provided with a female frusto conical surface at one end and provided with micrometer calibrations at the other end; a substantially cylindrical tool body member slidably in the said bushing and having a longitudinal slot of a width substantially equal to the diameter of the radial opening in said bushing and having a cutting face at one end and a male frusto conical surface at the other end, and being axially provided with internal threads at the frusto conical end; a lock screw extending axially through said adjusting sleeve and said bushing and threadably engaging the axial threads on said tool body member for drawing said frusto conical ended tool body member into spreading and locking relationship with said matingly ended adjusting screw; and a headed pin extending through said radial opening in said bushing extending into the slot of said tool body locking said bushing and tool body against rotation by nesting engagement in said recess provided in said base member.

3. In a tool adjustment mechanism for boring bars and the like, the combination including: a base member having an opening therethrough and having a coaxial counterbore forming a face and with a radially provided recess at one of the ends of said opening forming a face transverse to the axis of said opening; a shouldered bushing member of tubular character for insertion in said base member and having a radial opening through the wall thereof and said bushing being threaded internally at one end; a split tubular adjusting sleeve externally threaded and provided with a female frusto conical surface at one end and provided with micrometer calibrations at the other end; a substantially cylindrical tool body member slidably fitted in the said bushing and having a longitudinal slot of a width substantially equal to the diameter of the radial opening in said bushing and having a cutting face at one end and being axially provided with internal threads at the end opposite said cutting face; a cylindrical tubular buffer between said tool body and said adjusting screw and having a mating frusto conical face engageably expandable with said adjusting screw; a lock screw extending axially through said adjusting sleeve and said buffer and threadably engaging the axial threads on said tool body member for drawing said tool body member and said buffer into spreading and locking relationship with said matingly ended adjusting screw; and a headed pin extending through said radial opening in said bushing extending into the slot of said tool body and locking said bushing and tool body against rotation by nesting engagement in said recess provided in said base member.

4. A tool holder combination for insertion in a base member including: a bushing having internal threads; a body member insertable into said bushing and having a tapered surface at one end; a split threaded adjusting member having a mating tapered face; a locking element extending through said adjusting member in threaded axial relationship to said body member drawing said mating faces together, thereby forcing expansion of said adjusting member and locking the threads of said bushing and said adjusting means.

5. A tool holder combination for insertion in a base member including: a bushing having internal threads; a key member extending into said bushing; a longitudinally slotted body member through said bushing and having a tapered surface at one end and being secured against rotation by said key member nesting in sliding relationship in the slot in said body member; a split threaded adjusting member having a mating tapered face; a locking element extending through said adjusting member in threaded axial relationship to said body member drawing said mating faces together, thereby forcing expansion of said adjusting member and locking the threads of said bushing and said adjusting means.

References Cited in the file of this patent

UNITED STATES PATENTS

| | | |
|---|---|---|
| 1,861,439 | Guttman | June 7, 1932 |
| 2,125,005 | Jearum | July 26, 1938 |

FOREIGN PATENTS

| | | |
|---|---|---|
| 54,836 | Netherlands | July 15, 1943 |
| 619,549 | Great Britain | Mar. 10, 1949 |